July 19, 1955 M. F. GRUNWALD 2,713,228
SQUEEGEE FOR FISHING LINES AND THE LIKE
Filed Feb. 19, 1952
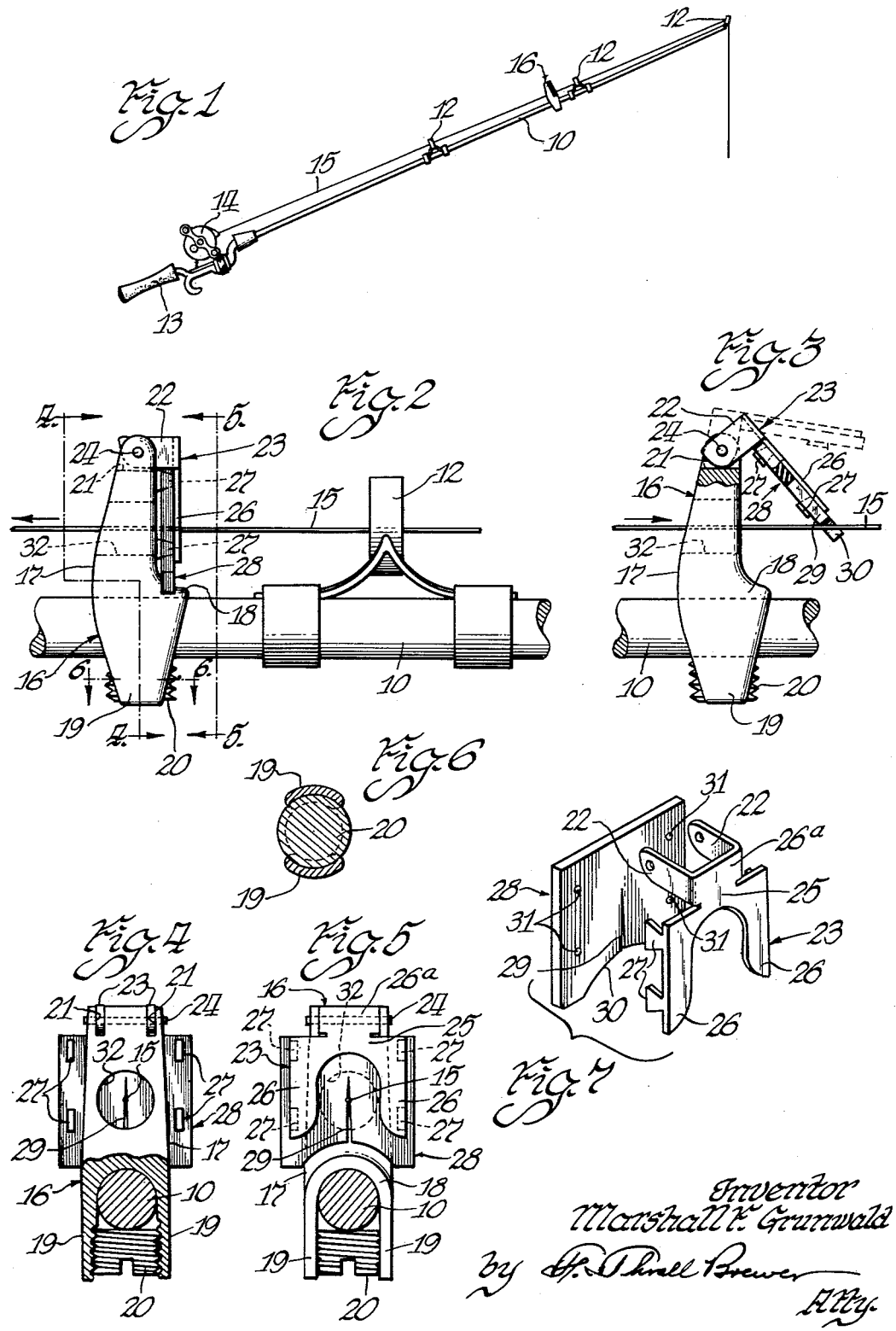
Inventor
Marshall F. Grunwald

United States Patent Office 2,713,228
Patented July 19, 1955

2,713,228

SQUEEGEE FOR FISHING LINES AND THE LIKE

Marshall F. Grunwald, Elmhurst, Ill.

Application February 19, 1952, Serial No. 272,363

7 Claims. (Cl. 43—25)

This invention relates to devices for removing water from fishing lines and the like, and more particularly to squeegees adapted to such use while the line is in normal use.

An object of my invention is to provide a water-removing device equipped with an easily removable and replaceable squeegee element through which a fishing line or the like may travel in use for effecting the removal of water therefrom. In the present instance, the squeegee element is removable so that it may be replaced if and when it becomes worn or damaged.

My invention has for another object the provision of a water-removing device including a squeegee element so constructed and arranged that the squeegee elements, in addition to being removable for replacement, is carried by a supporting structure which does not interfere with the squeegee action, but which carries the element for movement such that it does not materially affect line movements during use in casting or the like.

As another object, this invention has within its purview the provision of a replaceable squeegee element for a water-removing device, which element is adapted to inexpensive quantity production and is easily attached to and detached from the supporting structure of the device.

This invention further comprehends the provision of an effective and easily mounted structure for pivotally carrying a squeegee element. When the line travels in one direction, it goes through the squeegee element in order to have water or other liquid removed. When the line moves in the other direction, the squeegee element moves away from the line so as to allow the line to travel freely and easily.

Other objects and advantages will be apparent also from the following description of an exemplary embodiment of my invention disclosed for illustrative purposes by reference to the accompanying single sheet of drawings, in which Fig. 1 is a side elevational view depicting the adaptation of a preferred embodiment of my liquid-removing device to a conventional bait-casting rod equipped with a line and a reel;

Fig. 2 is an enlarged fragmentary side view of the structure shown in Fig. 1, and illustrates the positions of parts of the water removing device when the line moves in one direction along the rod;

Fig. 3 is a view of my water removing device similar to Fig. 2, but which depicts in solid lines the position of the parts when the line moves in a direction opposite to that of Fig. 2, and in dotted lines, an extreme position to which motion of a movable part is desirably limited in one direction of movement;

Figs. 4 and 5 are end sectional views taken respectively on lines 4—4 and 5—5 of Fig. 2, and in the direction indicated by the arrows;

Fig. 6 is a bottom sectional view taken substantially on a line 6—6 of Fig. 2 and in the direction of the arrows; and Fig. 7 is an exploded perspective view of a squeegee element and a holder upon which the element is adapted to be mounted in the disclosed embodiment of my invention.

In bait casting and the like a considerable amount of fishing line is played out in making a cast. At each cast, practically all of the line goes into the water and get soaked. Then, when the line is reeled in the soaked line normally carries a large portion of the water past the line guides and back to the reel. In time, a fisherman has his hands and clothes wet from the accumulation of water off of the line. The squeegee device of this invention removes a sufficient portion of the water from the line to prevent it from being a source of annoyance or discomfort to the fisherman; this result being accomplished without interfering with the normal casting operation of the rod, reel and line.

In the exemplary embodiment of this invention which is shown in the accompanying drawings for illustrative purposes, Fig. 1 depicts a casting rod 10 equipped with line guide ferrules 12 and provided with a handle 13. Near the handle, a reel 14 is removably secured in place on the rod for the storage of a quantity of casting line 15; said line extending along the rod and being threaded through the line guide ferrules. A bait or lure of any desired type (not shown) is connected to the free end of the line during use in casting. The weight of the lure is utilized along with proper casting motion of the rod to draw a considerable quantity of line from the reel when making a cast. After making such a cast, the line is retrieved by winding it back onto the reel.

The water-removing device 16 of this invention is secured to the rod 10 at a position for engagement with the casting line, and preferably near the rod tip. In the disclosed illustration, the device 16 is attached to the rod near the second ferrule. This provides a satisfactory position, since the action of the line is quite stable at that point, and water removed at that position will drain away at a distance from the fisherman and his boat.

The water-removing squeegee, as depicted in the various views of the drawings, includes a support 17 which has at one end a channelled saddle 18 having opposed side legs 19. The saddle is of a size to fit over the casting rod 10 and can be quickly and easily put in place or removed from the rod from the side thereof. The inner sides of the legs 19 are provided with interrupted threads into which a screw 20 is applied until it contacts the rod for holding the structure securely in place.

At the end opposite the saddle 18, the support 17 has spaced slots 21 which receive spaced ears 22 on a squeegee holder 23. The ears are retained in the slot by a pin 24 which provides an axis for swinging movement of the holder relative to the support 17. The main body of the holder 23 is U-shaped and includes a base portion 25 and spaced legs 26 which extend from the base in spaced relationship. The ears 22 are formed integrally with an extension 26a which projects from a mid-region of the end of the base 25 away from the legs 26. The holder has a plurality of projections 27 which extend from the same side of the holder as the ears 22 and increase in width when considered in a direction away from the holder. In the embodiment illustrated, the projections are four in number and are located at the outer edges of the legs 26, two near the free ends of the legs and two at the ends of the legs which merge with the base 25. The holder 23 may be formed from a sheet-metal blank that is stamped out, the ears 22 and the projections 27 being bent from the blank. The projections 27 serve as a mounting from removably retaining a squeegee element 28 on the side of the holder 23 toward the support 16.

The squeegee element 28 is made of a relatively soft and resilient material such as rubber, leather, or the like, which material is unharmed by water and is resistant to wear from friction with the line. As shown in Fig. 7, the squeegee element 28 has a central slit 29, extending from a concave end portion 30, and four openings 31 having the same spacing as the holder projections 27. The openings are preferably made smaller than the wide end portions of the projections and are stretched to receive the projections when the squeegee element 28 is being mounted on the holder 23. Because the projections 27 increase in width in a direction away from the holder, those projections firmly retain the squeegee element on the holder and against the surfaces of the legs 26.

In the operation of my squeegee device 16, the holder 23 and squeegee element 28 assume a position as depicted in Fig. 2 when the line 15 is being reeled in. The line moves in the direction of the arrow through the slit 29 in the squeegee element and an opening 32 in the support 17, and urges the squeegee element against the support 17. The squeegee element, being thus solidly backed by the support, cannot be pulled away from the holder by the line. The sides of the slit 29 press against the line 15, and the water is removed therefrom. The concave end portion 29 of the squeegee element fits over the curved surface of the saddle 18 of the support 17.

When the line 15 is traveling away from the reel, for example during casting, the parts of my squeegee device assume positions substantially as shown in Fig. 3. The drag of the line on the slit 29 of the squeegee element 30 swings the holder 23 and squeegee element away from the support 17 and out to the full-line position, so that the line no longer is in the slit 29, but at the end thereof at the curved end portion 30, and the line may play out freely. The movement of the rod 10 during casting may swing the squeegee element and the holder away from the support 17 as far as the dotted-line position of Fig. 3, but no farther, since in this position the ears 22 engage the bottoms of the slots 21 in the support 17. Thus, when the motion of casting is ended, the force of gravity will return the holder and squeegee element to the full-line position of Fig. 3, in which the squeegee element contacts the line 15. Then when the line is reeled in, as indicated by the arrow in Fig. 2, the holder and squeegee element will be returned to the position of Fig. 2, in which the squeegee element grips the line in the slit 29 to remove water from the line. If the squeegee element becomes worn or damaged by wear of the line, it may be easily removed and replaced by a new element.

While I have illustrated a preferred embodiment of my invention, modifications of such embodiment may be made without departing from the spirit of the invention, and I do not wish to be limited to the precise details of construction set forth, but desire to avail myself of all changes within the scope of the appended claims.

Having thus illustrated and described a preferred embodiment of my invention, what I claim as new and desire to secure by Letters Patent of the United States is:

1. A device for attachment to a casting rod for removing water from a casting line as it is being reeled in, said device comprising a support having at one end a saddle for engagement with the casting rod, said support also having spaced slots at the other end and a hole between the ends through which the line is adapted to pass, a holder having spaced ears and spaced legs, a squeegee element of relatively soft and resilient material stretched between the legs on the holder and having a slit at a region between the holder legs for receiving the casting line, and means pivotally connecting the spaced ears on the holder in the slots of the support so as to suspend the holder for free swinging movement relative to the support in a plane passing through the longitudinal mid-portions of the holder and support.

2. A device for attachment to a casting rod for removing water from a casting line when it is being reeled in, said device comprising a support having one end adapted for engagement with the rod, said support having slots as its other end and an opening therein between the ends through which the line is adapted to pass, a holder of substantially U-shape including a base from which spaced legs extend and spaced ears which extend from the plane of the base and legs, said ears being movably mounted in the slots in the support, means pinning the ears in the support slots to carry the holder for swinging movements relative to the support, and a squeegee element of relatively soft and resilient material removably mounted on the holder and extending between the holder legs, the squeegee element having a slit extending from the end adjacent the ends of the holder legs and between the holder legs and adapted to receive the casting line.

3. A device as specified in claim 2, and wherein the holder base and legs have projections on the side of the holder toward the support for removably retaining the squeegee element.

4. A device for attachment to a casting rod for removing water from a casting line as the line is being reeled in, said device comprising a support positionable with respect to the casting rod so as to extend laterally therefrom at a position to be traversed by the line, a holder of substantially U shape and having spaced legs, a base portion, and spaced ears on the base portion, a squeegee element of relatively soft and resilient material removably attached to the holder and bridging the space between the legs thereof, said squeegee element having a line-receiving slit extending between and in the direction of the legs from an end of the element adjacent the ends of the holder legs, and means connecting the ears of the holder to the support to provide a mounting providing for swinging movement of the holder on the support, said squeegee element having openings and being on the side of the holder toward the support, and the holder having projections at its base and at the ends of its legs which extend through the openings of the squeegee element for retaining the element on the holder.

5. A device for attachment to a casting rod for removing water from a casting line as the line is being reeled in, said device comprising a support positionable with respect to the casting rod so as to extend laterally therefrom at a position to be traversed by the line, a holder of substantially U shape and having spaced legs, a base portion, and spaced ears on the base portion, a squeegee element of relatively soft and resilient material removably attached to the holder and bridging the space between the legs thereof, said squeegee element having a line-receiving slit extending between and in the direction of the legs from an end of the element adjacent the ends of the holder legs, and means connecting the ears of the holder to the support to provide a mounting providing for swinging movement of the holder on the support, said holder having projections at its base and at the ends of its legs which increase in size in a direction away from the holder, and the squeegee element having openings and being stretched to enable the projections to pass therethrough for retaining it on the holder.

6. A device for attachment to a casting rod for removing water from a casting line as the line is being reeled in, said device comprising a support having at one end a saddle for engagement with the casting rod, said support also having slots at the other end and a hole between the ends through which the line is adapted to pass, a holder having spaced ears and spaced legs, a squeegee element of relatively soft and resilient material removably mounted on the holder and having a slit at a region between the holder legs for receiving the casting line, and means pivotally supporting the holder ears in the slots of the support, said squeegee element having openings and being mounted on the side of the holder toward the support and being mounted on the holder by projections on the holder which pass through the squeegee element.

7. A device for attachment to a casting rod for removing water from a casting line as the line is being reeled in, said device comprising a support having at one end a saddle for engagement with the casting rod, said support also having slots at the other end and a hole between the ends through which the line is adapted to pass, a holder having spaced ears and spaced legs, a squeegee element of relatively soft and resilient material removably mounted on the holder and having a slit at a region between the holder legs for receiving the casting line, and means pivotally supporting the holder ears in the slots of the support, said holder having four projections on the side toward the support which increase in size in a direction away from the holder, and the squeegee element having openings and being adapted to be stretched to enable the elements to pass therethrough for retaining it on the holder.

References Cited in the file of this patent

UNITED STATES PATENTS

| | | |
|---|---|---|
| 985,200 | Otto | Feb. 28, 1911 |
| 1,251,221 | Greenwald | Dec. 25, 1917 |
| 1,664,316 | Owens | Mar. 27, 1928 |
| 1,747,100 | Ashworth | Feb. 11, 1930 |
| 1,809,728 | Sather et al. | June 9, 1931 |
| 1,817,937 | Taylor | Aug. 11, 1931 |
| 1,916,933 | Peck | July 4, 1933 |
| 1,992,423 | Hale | Feb. 26, 1935 |